Figure 1:
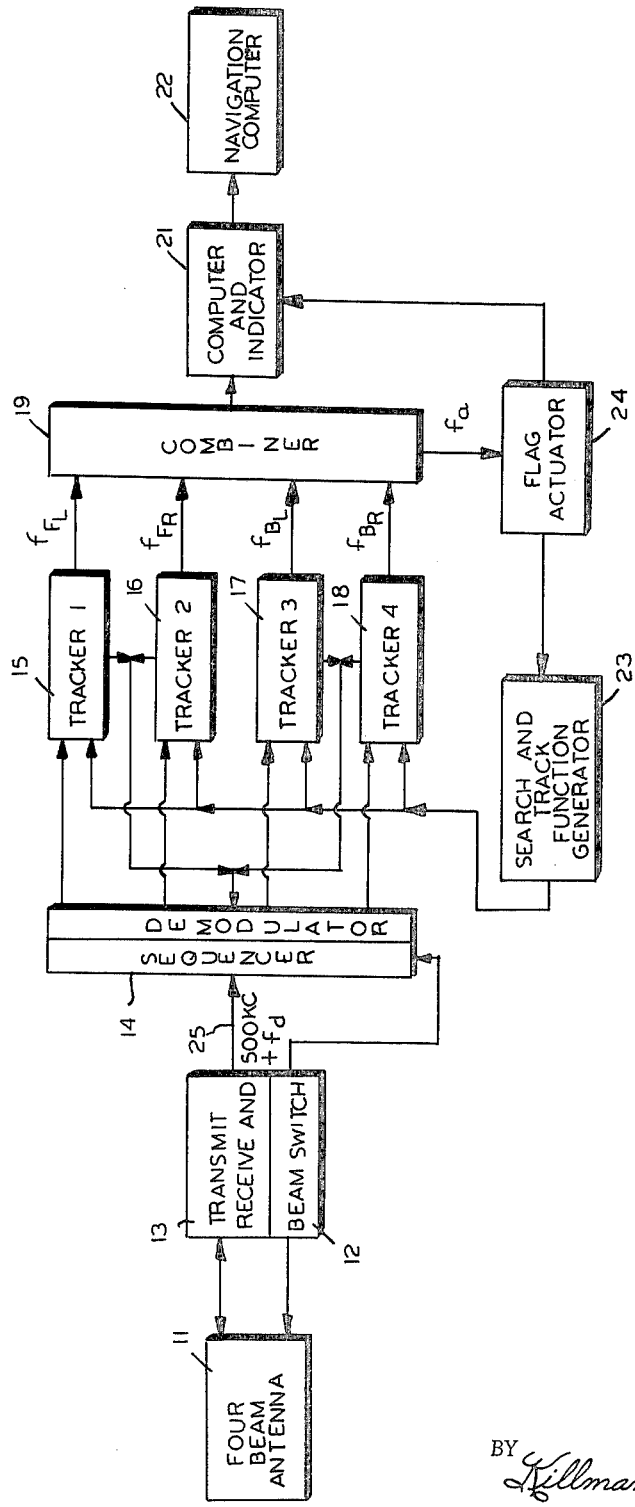

Jan. 18, 1966 S. L. ANEMA 3,230,525
ALARM FREQUENCY ERROR DETECTOR
Filed May 24, 1962 4 Sheets-Sheet 2
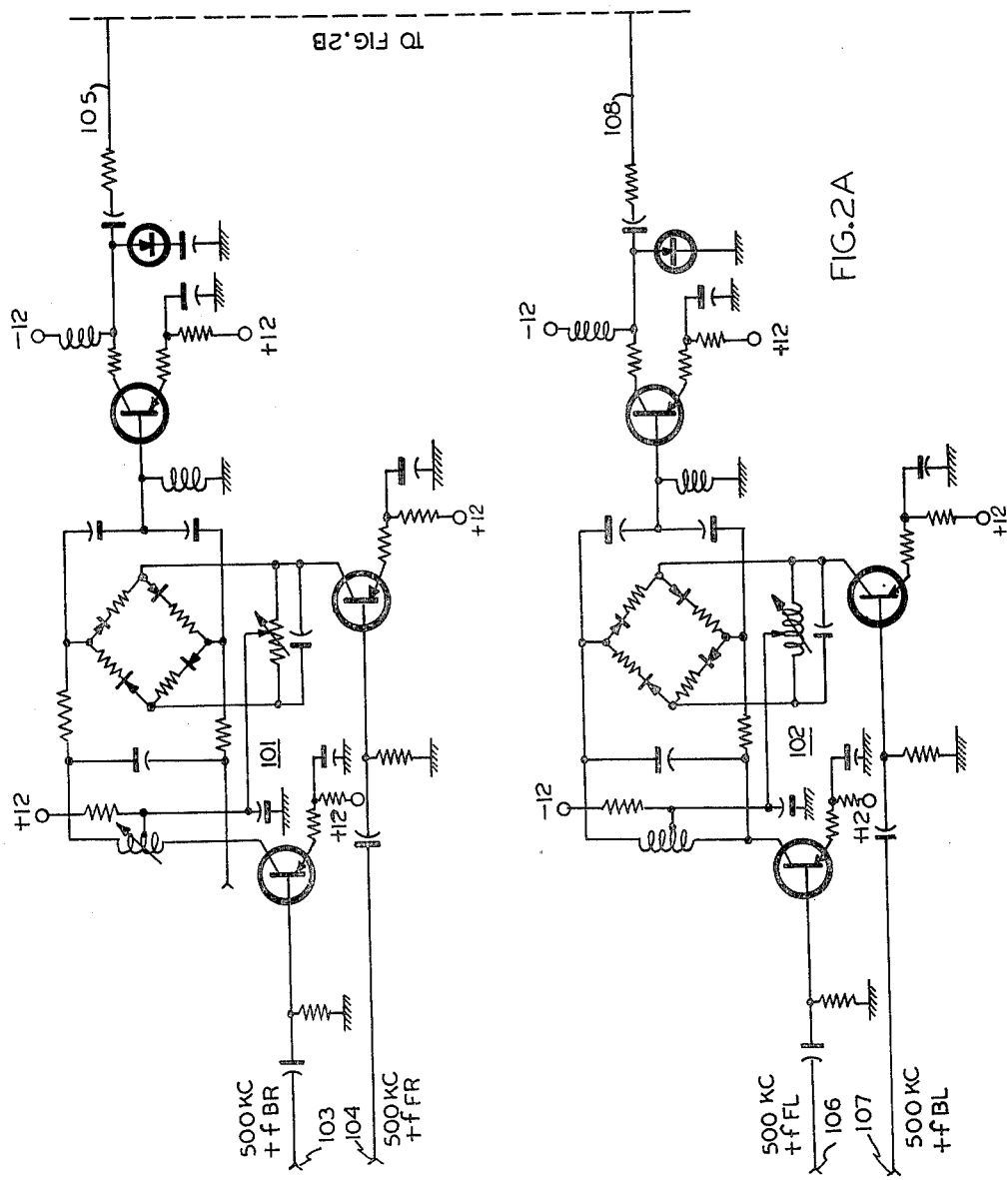
INVENTOR
SYBRAND L. ANEMA
BY Killman, Smith & Lamb
ATTORNEYS

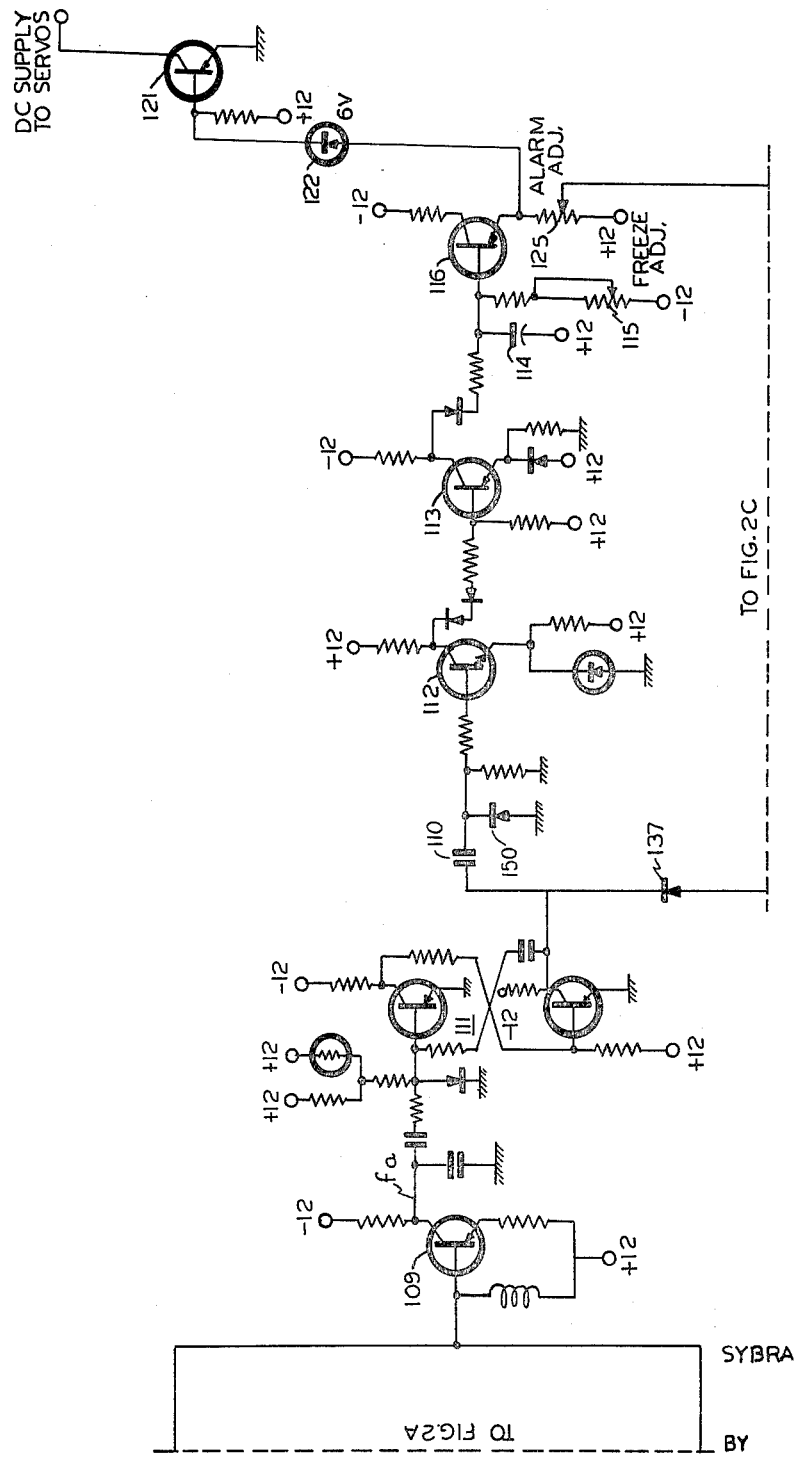

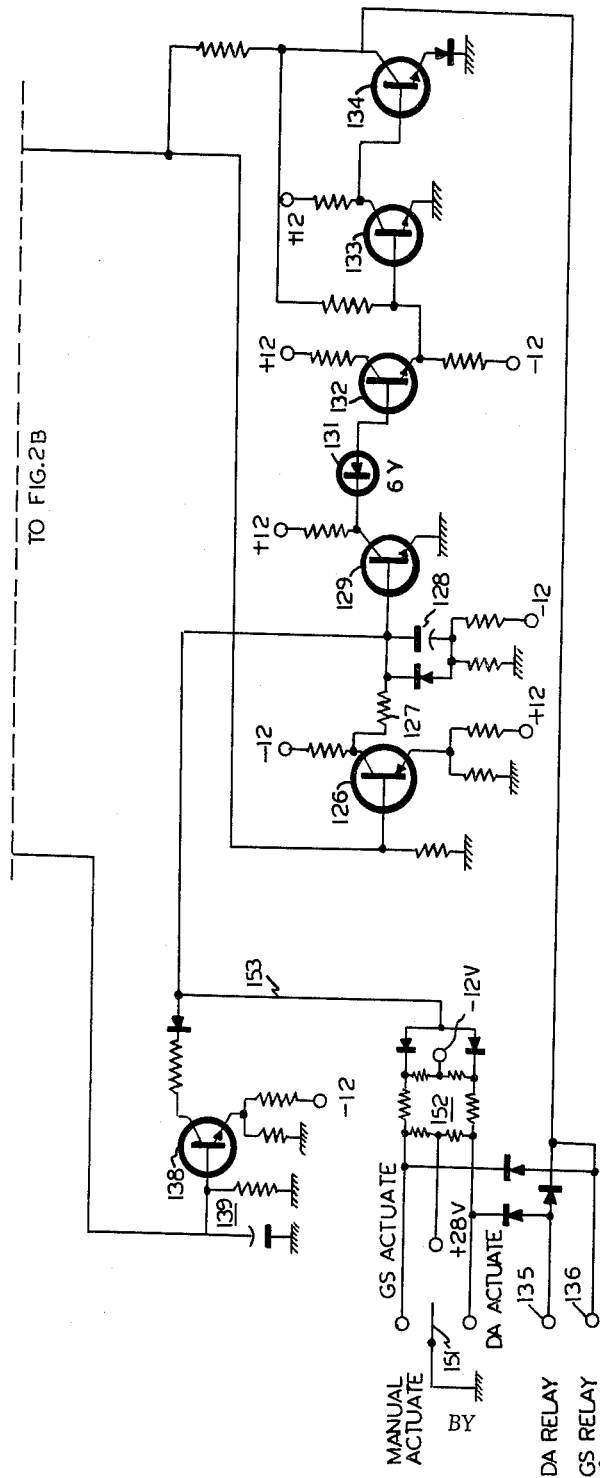

United States Patent Office 3,230,525
Patented Jan. 18, 1966

3,230,525
ALARM FREQUENCY ERROR DETECTOR
Sybrand L. Anema, Cockeysville, Md., assignor to The Bendix Corporation, Baltimore, Md., a corporation of Delaware
Filed May 24, 1962, Ser. No. 197,430
4 Claims. (Cl. 343—7)

This invention relates generally to Doppler navigation systems and more particularly to improved frequency tracking oscillator circuits and frequency lock detector circuits useful in Doppler systems.

The present invention is disclosed as an improvement in a portion of the system disclosed and claimed in the copending application of Gunkel et al., Serial No. 845,034, filed Oct. 7, 1959, and the application of B. L. Cordry, Serial No. 197,306, filed of even date, both assigned to the assignee of the present invention. In this copending application a Doppler navigation system is disclosed and claimed which utilizes an antenna fixed relative to the aircraft and which produces sequentially four downwardly directed beams positioned symmetrically in the four quadrants defined by the horizontal longitudinal and transverse coordinates of the aircraft. The Doppler data developed from each of the beams is translated into an equivalent Doppler center spectrum frequency generated by four local tracking oscillators operated to provide a distinct frequency corresponding to the center of the spectrum of the Doppler energy returned on each of the beams. This tracker oscillator frequency for each of the four beams is combined by various algebraic manipulations to produce other frequencies which are utilized to derive ground speed and drift angle data and produce indications of these quantities therefrom.

In frequency trackers of the prior art it has been found that the limiting factor in system sensitivity is the ability to determine whether or not the oscillator is actually tracking a returned Doppler signal. This limitation results from the fact that the trackers utilize correlation and synchronous demodulation techniques and hence are capable of operation with signals that are appreciably below the noise level and hence the track lock detector which is attempting to operate on an amplitude detected signal is the limiting factor in the system operation. Under these conditions the full capabilities of a tracking oscillator may not be realized since the data from such an oscillator can only reliably be used when one is certain that the oscillator is tracking. In actual practice, it has been found that the system is capable of producing useful data from signals well below the lower signal level at which the prior art frequency lock detectors could be relied upon to assure that the data from the tracking oscillator was good. On the other hand, any attempt to utilize the data from the tracking oscillator below the level at which the lock detector would indicate that the data was good might result in an actual reliance upon bad data, since the tracking oscillator would continue to produce an output frequency even though the input signal thereto had completely disappeared.

In order to overcome the limitations of prior frequency lock detectors and tracking oscillator systems, the present invention utilizes a unique feature of a fixed antenna beam position Doppler system which provides a combination of frequencies that is always substantially zero whenever correct data are being received on all four of the beams of the Doppler system. Since this frequency is always zero if the data on all beams are correct data, the occurrence of an error in the output of any tracking oscillator for any beam changes this unique frequency combination from zero to some frequency greater than zero by an amount depending upon the error in the data. Thus by detecting when this unique frequency is higher than a predetermined value, say, of 500 cycles, a reliable indication is available that one or more of the tracking oscillators is not tracking. The present invention utilizes this indication to initiate slewing of the tracking oscillators in order that the correct tracking operation can be reattained while at the same time preserving the last good data by freezing the servos which read out the data to the indicators and navigation instruments.

In order to prevent an erroneous operating condition to exist, the present invention provides a check on the zero frequency quantity to assure that the absence of an alternating current quantity is not due to the complete absence of signal.

It is accordingly the primary object of the present invention to provide arrangements for checking the zero frequency alarm of a Doppler navigation system.

These and other objects of the invention will appear from the following detailed description taken in conjunction with the accompanying drawings wherein:

FIG. 1 is a block diagram of a complete Doppler navigation system; and

FIGS. 2A, B and C together comprise the circuit for the track lock detector and flag alarm circuits.

Referring now to FIG. 1, the general description of the system will be given, reference being made to the herein by reference for a detailed understanding of the system includes a four-beam antenna 11 which is operated to produce sequentially four distinct beam positions relative to the aircraft. For this purpose a beam switch control device 12 is provided in conjunction with the transmit and receive portion of the circuit 13 for carrying on the transmission of microwave energy sequentially over the four beams of the antenna and receiving Doppler shifted signals from the ground. The transmit-receive device 13 supplies the Doppler signals $f_d$ on a 500 kc. carrier to the input of a sequencer 14 which is operated in synchronism with the beam switch signals to apply the received Doppler signal on individual beams to four separate trackers 15, 16, 17, and 18. The trackers are supplied input signals in sequence with the rotation of the beam of the antenna to produce a continuous output frequency corresponding to the center of the Doppler spectrum received from each beam position. These four frequencies are designated $f_{FL}$, $f_{FR}$, $f_{BL}$, and $f_{BR}$ and are applied to a combiner 19 where various algebraic combinations of these frequencies are obtained. The combiner 19 supplies signals to a ground speed and drift angle computer 21 which may indicate these quantities and also supply data to a navigation computer 22 for navigating the aircraft.

The trackers 15–18 are operated under the control of a search and track function generator 23 which operates to slew the trackers initially until they lock on a correct Doppler signal and after lock-on periodically to deviate the frequency of the tracking oscillators to check their operation. The generator 23 is under the control of a flag actuator circuit 24 which operates in response to the frequency $f_a$ which is defined as the differene between the sums of the left beams and the sums of the right beams. As shown in the referenced copending application of Cordry, the sum $f_{FL} - f_{FR} + f_{BL} - f_{BR}$ is equal to zero whenever all of the beam frequencies are correct. The flag actuator circuit 24 also controls the servos in the computer 21 to lock them in their last position whenever the data becomes unusable in the system and if the data is in error by a predetermined amount and exists for sufficiently long time, a flag indicator is raised to notify the pilot that the system is not operating properly.

Referring now to FIGS. 2A, B and C assembled as indicated, the flag actuator circuit 24, wherein lies the improvement of the present invention, will be described. In FIG. 2A a ring modulator circuit 101 is arranged to add the single sideband Doppler frequencies from the trackers for the right-hand beams to obtain the sum of these frequencies. Thus the frequency of 500 kc.$+f_{BR}$ is applied to terminal 103 and the frequency of 500 kc.$+f_{FR}$ is applied to terminal 104. The output of the ring modulator 101 on lead 105 is thus 1 mc.$+f_{BR}+f_{FR}$. A second ring modulator 102 is connected to add the tracker frequencies corresponding to the left beams. The frequency 500 kc.$+f_{FL}$ is applied to terminal 106 and the frequency of 500 kc.$+f_{BL}$ is applied to terminal 107 and at lead 108 the frequency of 1 mc.$+f_{FFL}+f_{BL}$ appears.

The signals on leads 105 and 108 are both applied to non-linear mixer transistor 109 (FIG. 2B) where the frequencies of these signals are subtracted to produce an audio frequency signal in the collector circuit of transistor 109 corresponding to the frequency $f_a$ previously defined. The sum components in the collector circuit of the mixer 109 are bypassed to ground.

The frequency $f_a$ from the output of mixer 109 is applied to a monostable hysteresis switch 111 which generates a square wave at the frequency $f_a$. This square wave is differentiated in capacitor 110, the output of which is limited to a single polarity by diode 150, and applied to an NPN pulse shaper transistor 112 and a pulse amplifier 113 to produce a pulse of predetermined amplitude and duration for each cycle of the frequency $f_a$. This pulse is applied to an integration capacitor 114 which is provided with an adjustable time constant circuit by means of variable resistor 115 connected to the negative 12 volt supply. A transistor 116 is normally conducting when $f_a$ is near zero frequency and capacitor 114 has accumulated no charge from pulse amplifier 113. By means of the adjustable resistor 115, the emitter voltage of transistor 116 can be set to be minus 6 volts when the frequency $f_a$ is 500 cycles. If $f_a$ is greater than 500 cycles, the transistor 116 approaches cut-off due to the accumulation of the positive pulses in integrator capacitor 114 and the emitter voltage of transistor 116 becomes more positive than negative 6 volts. When $f_a$ is less than 500 cycles, the emitter voltage of transistor 116 is more negative than minus 6 volts and the system is operating normally with good data.

The two conditions of operation of the system are with good data being received and all servos operating to supply the output signals and indications required from the system and with bad data being received either of two conditions existing—(1) if the data is incorrect to the extent that $f_a$ exceeds 500 cycles, the servos will be locked but the alarm will not be given and (2) if the frequency $f_a$ exceeds 1500 cycles and persists for a sufficient time the alarm indication will be given. A delay of 10 seconds is provided as hereinafter described before an alarm indication is given to assure that the large value of $f_a$ is not due to a momentary error but one of substantial duration and hence contributing significantly to error in the output of the system.

The foregoing operating conditions are derived from the emitter circuit of the transistor 116 as follows. The D.C. supply to all of the mechanical servos in the system is through the collector-emitter circuit of a transistor 121. When the transistor 121 is conducting the collector is effectively grounded and a circuit through the servos is energized through this ground connection of the emitter of transistor 121. The transistor 121 is normally biased for conduction through a 6 volt coupling zener diode 122 and the normally conducting emitter-collector path of transistor 116, a small collector resistor and the negative 12 volt supply. For this condition the emitter of transistor 116 is effectively at minus 12 volts. As the positive pulses build up charge on capacitor 114 corresponding to increasing frequencies of $f_a$, the transistor 116 becomes less conductive and its emitter voltage becomes less negative until at −6 volts the isolation diode 122 becomes non-conductive and the positive supply bias to the base of transistor 121 cuts off that transistor thereby interrupting the D.C. supply to the mechanical servos of the system and in effect freezing the indicators and computs with their last available good data value.

The alarm circuit is controlled at an adjustable level by means of an adjustable tap on emitter load resistor 125 of the transistor 116 which is set to apply positive 6 volts to the base of a transistor 126 (FIG. 2C) whenever the frequency $f_a$ is 1500 cycles or greater. Prior to the application of +6 volts to the base of transistor 126, it conducts and charges a capacitor 128 to +6 volts from the emitter bias supply of transistor 126. When the base of transistor 126 is positive 6 volts, the transistor is cut off and connects the negative 12 volt collector supply through the collector resistor and an RC time constant circuit consisting of resistor 127 and capacitor 128 for discharging the capacitor 128. The time constant of resistor 127 and capacitor 128 is 10 seconds so that only if the transistor 126 is cut off for approximately 10 seconds does the voltage applied to the base of NPN transistor 129 from capacitor 128 drop to ground. When the base of transistor 129 is at ground potential, it is cut off. The transistor 129 is specially selected as a silicon low cut off current type and the capacitor 128 is of low leakage in order to preserve the extremely long time constant of the combination of resistor 127 and capacitor 128.

If $f_a$ is 1500 cycles or greater for 10 seconds transistor 129 is cut off and this action applies a positive 12 volt potential to a 6 volt zener isolation diode 131 causing it to conduct. This initiates conduction in an NPN transistor 132 which, when conducting, applies a positive collector supply voltage to the base of transistor 133 causing it to conduct thus grounding the base of transistor 134 and cutting it off. The transistor 134 is normally conducting for the receipt of good data and in this condition its collector-emitter path provides the grounding circuit for the drift angle relay (not shown) connected to terminal 135 and the ground speed relay (not shown) connected to terminal 136. When conduction in transistor 134 is interrupted by the alarm condition just described, the normally energized drift angle and ground speed relay circuits are opened to interrupt the data circuits to the indicators and to produce an alarm indication as well as the alarm condition to the remainder of the system.

A fault detector circuit is provided by connecting the output of the hysteresis switch 111 through a coupling diode 137 to the base of an NPN transistor 138. For normal operation $f_a$ is some low frequency but not zero and hence the square wave from the hysteresis switch 111 charges an RC circuit 139 to make the base of transistor 138 approximately −6 volts and the transistor is cut off. If $f_a$ should disappear, however, due to some fault in the system, the output of the switch 111 would be ground potential with the lower transistor of the monostable pair conducting. This D.C. level will produce no output in the A.C. coupled sequence of transistors 112, 113, 116 but it will cut off diode 137. This condition permits the capacitor of RC circuit 139 to discharge and after a short time delay causes the transistor 138 to conduct. Conduction in transistor 138 applies negative voltage from its emitter supply through its collector-emitter path to discharge capacitor 128 and establish the alarm condition.

A manual actuate switch 151 is provided for selectively grounding through isolation diodes the drift angle and ground speed relay circuits connected to terminals 135 and 136. This manual operation provides an alternate circuit equivalent to that through transistor 134 for checking out the drift angle and ground speed relay circuits by applying test signals (not shown). A decoupling network 152 is provided for applying a negative voltage on line 153 to initiate the alarm condition by discharging capacitor 128 whenever the manual actuate switch is connected.

Various modifications in the disclosed circuit may be made without departing from the scope of the invention which is defined by the appended claims.

I claim:
1. In a Doppler radar system including a four beam antenna and four tracking oscillators for following the Doppler spectra in the radar return, an alarm frequency error detector comprising:
- a first modulator providing the sum of the frequencies of a first pair of said oscillators,
- a second modulator providing the sum of the frequencies of the remaining pair of said oscillators,
- a mixer providing the difference frequency between the sum outputs of said first and second modulators,
- means responsive to said difference frequency of a first magnitude for arresting the utilization of signal from said oscillators, and
- means responsive to said difference frequency of a second magnitude larger than said first for actuating an alarm.

2. In a Doppler radar system including a four beam antenna and four tracking oscillators for following the Doppler spectra in the radar return; an error detector for actuating an alarm comprising:
- a first modulator providing the sum of the frequencies of a first pair of said oscillators,
- a second modulator providing the sum of the frequencies of the remaining pair of said oscillators,
- means combining the outputs of said first and second modulators to produce a signal having a frequency equal to the difference in frequency between said modulator outputs,
- means for shaping the output of said combining means into a square wave to provide a signal of constant amplitude and variable frequency in accordance with said combining means output,
- means providing a signal a magnitude proportional to the frequency of the signal from said shaping means,
- means responsive to a first magnitude of said frequency proportional signal for interrupting the utilization of signals from said oscillators, and
- means responsive to zero magnitude and to a second magnitude higher than said first magnitude of said frequency proportional signal for actuating an alarm.

3. Apparatus as claimed in claim 2, wherein said means providing a frequency proportional signal comprises
- means for differentiating said shaped output,
- means for selecting a single polarity of said differentiated output, and an integration network for accumulating said single polarity differentials.

4. In a Doppler radar system including a four beam antenna, four tracking oscillators for following the Doppler spectra of the radar return, means for processing the output of said oscillators to provide useful data, means for displaying the data and an alarm indicator for warning of the appearance of erroneous data, an alarm actuating circuit comprising,
- a first ring modulator producing the sum frequency of a first pair of said oscillators,
- a second ring modulator producing the sum frequency of the remaining pair of said oscillators,
- means for mixing the outputs of said modulators to provide the difference frequency therebetween,
- means for shaping said mixer output into a square wave to provide a signal of constant amplitude and variable frequency as determined by said difference frequency,
- means for differentiating said shaped signal,
- means for selecting a single polarity of said differentiated signal,
- an integrating network receiving said single polarity differentials and providing an output proportional to the frequency thereof,
- first switching means actuated by a first magnitude of output from said integrating network for holding the display of data constant at the value prevailing at the time of relay actuation, and
- second switching means actuated either by zero magnitude or by a second magnitude higher than said first magnitude of the output of said integrating network for operating said alarm indicator.

References Cited by the Examiner

UNITED STATES PATENTS

| | | | |
|---|---|---|---|
| 2,617,093 | 11/1952 | Fyler | 343—7.3 |
| 2,982,956 | 5/1961 | Meyer | 343—8 |
| 3,086,201 | 4/1963 | Smith et al. | 343—8 |
| 3,088,109 | 4/1963 | Meyer | 343—9 |

CHESTER L. JUSTUS, *Primary Examiner.*

KATHLEEN CLAFFY, *Examiner.*